United States Patent
Fukasawa et al.

(10) Patent No.: US 7,016,677 B2
(45) Date of Patent: Mar. 21, 2006

(54) SWITCHING STATION, SUBSCRIBER LOCATION INFORMATION REGISTRATION METHOD, SUBSCRIBER SERVICE INFORMATION ACQUISITION METHOD, SUBSCRIBER SERVICE INFORMATION REGISTRATION METHOD, AND SUBSCRIBER SERVICE INFORMATION TRANSMISSION METHOD

(75) Inventors: Kayoko Fukasawa, Kanagawa (JP); Masahide Ishida, Aichi (JP); Kazuo Sugiyama, Kanagawa (JP); Koji Yamamoto, Saitama (JP); Kenji Kobayashi, Kanagawa (JP); Kazuyuki Kozu, Kanagawa (JP)

(73) Assignee: NTT DoCoMo, Inc., Tokyo (JP)

(*) Notice: Subject to any disclaimer, the term of this patent is extended or adjusted under 35 U.S.C. 154(b) by 506 days.

(21) Appl. No.: 10/071,933

(22) Filed: Feb. 7, 2002

(65) Prior Publication Data

US 2002/0123346 A1  Sep. 5, 2002

(30) Foreign Application Priority Data

Feb. 7, 2001  (JP)  .............................. 2001-031467

(51) Int. Cl.
*H04Q 7/20* (2006.01)

(52) U.S. Cl. .................... 455/435; 455/433; 455/562.1; 455/561.1; 455/439; 455/440; 455/448; 455/450; 455/452.2; 455/432.1; 455/435.2; 455/464

(58) Field of Classification Search ................ 455/433, 455/562.1, 456.1, 435.2, 439, 440, 448, 450, 455/452.2, 432.1, 464
See application file for complete search history.

(56) References Cited

U.S. PATENT DOCUMENTS 6,078,811 A  6/2000 Lin et al. ..................... 455/433

6,097,951 A  8/2000 Ernam et al.
6,463,284 B1 * 10/2002 Nakamura et al. .......... 455/433
6,804,540 B1 * 10/2004 Shepherd et al. ........ 455/562.1

FOREIGN PATENT DOCUMENTS

| EP | 1 065 904 A1 | 1/2001 |
| JP | 2000-092553 A | 3/2000 |
| JP | 2000-138960 | 5/2000 |

OTHER PUBLICATIONS

Overflow Control for Cellular Mobility Database, Yi-Bing Lin, IEEE Transactions on Vehicular Tehcnology, Vo. 40, No. 2, Mar. 2000, pp. 520-530.
Eliminating Overflow for Large-Scale Mobility Databases in Cellular Telephone Networks,, Yi-Bing Lin, IEEE Transactions on Computers, vol. 50, No. 4, Apr. 2001, pp. 356-370.
Official Notice of Rejection Case No.: DCMH130575 Patent Application No.: 2002-031406.

* cited by examiner

Primary Examiner—Joseph Feild
Assistant Examiner—David Q. Nguyen
(74) Attorney, Agent, or Firm—Workman Nydegger

(57) ABSTRACT

A switching station etc., are provided. When a mobile station moves from an area of a switching station into an area of another switching station having a VLR which has accepted the maximum number of subscribers, the switching station registers subscriber location information about the mobile station in an HLR even through it cannot register the subscriber service information in its VLR. When a call origination signal is transmitted from the mobile station, the switching station performs call origination connection processing by acquiring the subscriber service information about the mobile station from the HLR. When call termination to the mobile station occurs, the switching station can perform call termination processing normally since the subscriber location information is correctly updated in the HLR. The switching station performs call termination processing by acquiring the subscriber service information from the HLR.

12 Claims, 18 Drawing Sheets

| MOBILE STATION (SUBSCRIBER) | TIMER#2 | STATE | PRIORITY |
|---|---|---|---|
| A | TEN MINUTES | ATTACH STATE | 4 |
| B | TWO HOURS | ATTACH STATE | 3 |
| C | THIRTY MINUTES | DETACH STATE | 2 |
| D | ONE HOUR | DETACH STATE | 1 |

FIG.14

| MOBILE STATION (SUBSCRIBER) | COMMUNICATION STATE | PRIORITY |
|---|---|---|
| A | NOT IN COMMUNICATION | 1 |
| B | IN COMMUNICATION | 3 |
| C | IN COMMUNICATION | 3 |
| D | NOT IN COMMUNICATION | 1 |

FIG.16

SWITCHING STATION, SUBSCRIBER LOCATION INFORMATION REGISTRATION METHOD, SUBSCRIBER SERVICE INFORMATION ACQUISITION METHOD, SUBSCRIBER SERVICE INFORMATION REGISTRATION METHOD, AND SUBSCRIBER SERVICE INFORMATION TRANSMISSION METHOD

This application claims priority under 35 U.S.C. 119 to Patent Application No. 2001-31467 filed Feb. 7, 2001 in Japan, the content of which is incorporated hereinto by reference.

BACKGROUND OF THE INVENTION

1. Field of the Invention

The present invention relates to a switching station, a subscriber location information registration method, a subscriber service information acquisition method, a subscriber service information registration method, and a subscriber service information transmission method.

2. Description of the Related Art

There are two methods for mobility control in mobile communication: an HLR (Home Location Register) method in which location information and service information of subscribers (users) are managed by an apparatus physically separated from a switching station; and a VLR (Visited Location Register) method in which subscriber location information and service information are managed by a VLR in a switching station.

In the case of the VLR method, if the location of a user cannot be registered after the maximum number of accommodated users has been reached, neither of call origination and call termination by the user is allowed.

In connection processing of location registration function, call origination function and call termination function of the VLR method, when a mobile station moves into an area covered by a switching station, the mobile station recognizes change of location area and transmits a location registration signal to the switching station. The switching station acquires subscriber service information about the mobile station from the switching station in whose coverage area the mobile station has been located (from the HLR at the time of the first location registration). Also, information on the location of the mobile station used at the time of call termination is registered in the HLR. When the mobile station makes a call origination, the switching station performs call origination processing by using subscriber service information from the VLR. At the time of call termination, call termination processing is performed by using the (subscriber) location information from the HLR.

FIG. 1 is a diagram showing an example of a conventional mobile communication system and an example of processing when a location registration request is made. Referring to FIG. 1, switching stations 11 and 12 have VLR 21 and 22, respectively.

When a mobile station 50 moves from an (service) area 32 of the switching station 12 into an area 31 of the switching station 11 having the VLR 21 which has accepted the maximum number of subscribers, the switching station 11 receives a location registration (request) signal from the mobile station 50 (in S11 of FIG. 1) and acquires (in S12) subscriber service information about the mobile station 50 from the switching station 12 in whose coverage area the mobile station 50 has been located. However, no subscriber service information can be newly registered in the VLR 21 (in S13). Therefore location registration processing ends in failure (in S14) and updating (registration) of subscriber location information in an HLR 40 is not performed. If the subscriber makes call origination in such a situation, call origination processing is not normally performed since the switching station 11 has no service information about the subscriber on the VLR 21. Call termination processing also ends in failure since the subscriber location information in the HLR 40 has not been updated.

The number of subscribers (subscriber information items) possible to be registered in the VLR depends on hardware resources. Also, because the hardware resources are fixedly assigned, it is not possible to manage information on dynamically changing subscribers (users) with flexibility.

SUMMARY OF THE INVENTION

Therefore an object of the present invention is to enable a subscriber to acquire service without dependence on the accommodation capacity of a management unit which manages subscriber information.

In order to accomplish the above mentioned object, in the first aspect of the present invention, there is provided a switching station comprising: means for receiving a location registration signal from a mobile station; and means for registering, when the location registration signal is received, subscriber location information about the mobile station that has transmitted the location registration signal in a second management unit managing subscriber information in a case where no subscriber service information can be newly registered in a first management unit provided for use with the switching station and managing subscriber information.

Here, the first management unit may be a VLR.

Here, the second management unit may be an HLR.

In the second aspect of the present invention, there is provided a switching station comprising: means for receiving a call origination signal from a mobile station; and means for acquiring, when the call origination signal is received, subscriber service information about the mobile station that has transmitted the call origination signal from a second management unit managing subscriber information in a case where the subscriber service information about the mobile station that has transmitted the call origination signal is not registered in a first management unit provided for use with the switching station and managing subscriber information.

Here, the first management unit may be a VLR.

Here, the second management unit may be an HLR.

In the third aspect of the present invention, there is provided a switching station comprising: means for receiving a call termination signal to a mobile station; and means for acquiring, when the call termination signal is received, subscriber service information about the mobile station designated as a destination of the call termination signal from a second management unit managing subscriber information in a case where the subscriber service information about the mobile station designated as the destination of the call termination signal is not registered in a first management unit provided for use with the switching station and managing subscriber information.

Here, the first management unit may be a VLR.

Here, the second management unit may be an HLR.

In the fourth aspect of the present invention, there is provided a switching station comprising: means for receiving a location registration signal from a mobile station; and means for registering, when the location registration signal is received, subscriber service information about the mobile station that has transmitted the location registration signal in a management unit provided for use with another switching station and managing subscriber information in a case where no subscriber service information can be newly registered in a management unit provided for use with the switching station and managing subscriber information.

Here, the management unit may be a VLR.

In the fifth aspect of the present invention, there is provided a switching station comprising: means for receiving a call origination signal from a mobile station; and means for acquiring, when the call origination signal is received, subscriber service information about the mobile station that has transmitted the call origination signal from a management unit provided for use with another switching station and managing subscriber information in a case where the subscriber service information about the mobile station that has transmitted the call origination signal is not registered in a management unit provided for use with the switching station and managing subscriber information.

Here, the management unit may be a VLR.

In the sixth aspect of the present invention, there is provided a switching station comprising: means for receiving a call termination signal to a mobile station; and means for acquiring, when the call termination signal is received, subscriber service information about the mobile station designated as a destination of the call termination signal from a management unit provided for use with another switching station and managing subscriber information in a case where the subscriber service information about the mobile station designated as the destination of the call termination signal is not registered in a management unit provided for use with the switching station and managing subscriber information.

Here, the management unit may be a VLR.

In the seventh aspect of the present invention, there is provided a switching station comprising: means for registering, at a request from another switching station, subscriber service information in a management unit provided for use with the switching station and managing subscriber information; and means for transmitting the subscriber service information registered in the management unit to the another switching station at a request from the another switching station.

Here, the management unit may be a VLR.

In the eighth aspect of the present invention, there is provided a switching station comprising: means for receiving a location registration signal from a mobile station; and means for deleting, when the location registration signal is received, one of pieces of subscriber service information presently registered in a first management unit provided for use with the switching station and managing subscriber information, and for registering subscriber service information of the mobile station that has transmitted the location registration signal in the first management unit provided for use with the switching station, in a case where no subscriber service information can be newly registered in the first management unit provided for use with the switching station.

Here, the may further comprises means for registering subscriber location information about a mobile station in a second management unit managing subscriber information, and means for receiving subscriber service information about a mobile station from the second management unit, wherein the switching station may register, when the location registration signal is received, subscriber location information about the mobile station that has transmitted the location registration signal in a second management unit managing subscriber information, receive subscriber service information about the mobile station that has transmitted the location registration signal from the second management unit, delete one of pieces of subscriber service information presently registered in the first management unit provided for use with the switching station, and register the subscriber service information of the mobile station that has transmitted the location registration signal in the first management unit provided for use with the switching station, in a case where no subscriber service information can be newly registered in the first management unit provided for use with the switching station.

Here, the second management unit may be an HLR.

Here, the switching station may further comprises means for registering subscriber location information about a mobile station in a second management unit managing subscriber information, wherein when the switching station deletes one of pieces of subscriber service information presently registered in the first management unit for use with the switching station, the switching station may decide not to delete, from the first management unit for use with the switching station, subscriber location information about a mobile station corresponding to the subscriber service information to be deleted, and wherein when the switching station receives the location registration signal from the mobile station, the switching station may register in the second management unit the subscriber location information about the mobile station registered in the first management unit for use with the switching station.

Here, the second management unit may be an HLR.

Here, the switching station may further comprises means for receiving a call origination signal from a mobile station, and means for acquiring subscriber service information about a mobile station from a second management unit managing subscriber information, wherein when the switching station receives, after deleting one of pieces of subscriber service information presently registered in the first management unit for use with the switching station, a call origination signal from a mobile station corresponding to the deleted subscriber service information, the switching station may acquire the subscriber service information about the mobile station from the second management unit, and, if the acquired subscriber service information cannot be newly registered in the first management unit for use with the switching station, the switching station may delete one of pieces of subscriber service information presently registered in the first management unit, and registers the acquired subscriber service information in the first management unit for use with the switching station.

Here, the second management unit may be an HLR.

Here, the switching station may further comprises means for receiving a call termination signal to a mobile station, and means for acquiring subscriber service information about a mobile station from a second management unit managing subscriber information, wherein when the switching station receives, after deleting one of pieces of subscriber service information presently registered in the first management unit for use with the switching station, a call termination signal to a mobile station corresponding to the deleted subscriber service information, the switching station may acquire the subscriber service information about the mobile station from the second management unit, and, if the acquired subscriber service information cannot be newly registered in the first management unit for use with the switching station, the switching station may delete one of pieces of subscriber service information presently registered in the first management unit, and registers the acquired subscriber service information in the first management unit for use with the switching station.

Here, the second management unit may be an HLR.

Here, the first management unit may be a VLR.

Here, the switching station may select the mobile station whose subscriber service information is to be deleted, in consideration of at least one of call origination, call termination, location registration, and power state of mobile stations.

Here, the switching station may select, as the mobile station whose subscriber service information is to be deleted, a mobile station which has made neither call origination nor call termination during the longest time period till the present time.

Here, the switching station may select, as the mobile station whose subscriber service information is to be deleted, a mobile station which has made neither call origination, call termination nor location registration for predetermined period of time, or a mobile station whose power state is off.

Here, the switching station may select the mobile station whose subscriber service information is to be deleted, in consideration of communication state of mobile stations.

Here, the switching station may register, when it resisters subscriber service information, the subscriber service information as first type of subscriber service information or as second type of subscriber service information, and select the subscriber service information to be deleted from the first type of subscriber service information.

In the ninth aspect of the present invention, there is provided a subscriber location information registration method comprising the steps of: receiving, at a switching station, a location registration signal from a mobile station; and registering, at the switching station, when the location registration signal is received, subscriber location information about the mobile station that has transmitted the location registration signal in a second management unit managing subscriber information in a case where no subscriber service information can be newly registered in a first management unit provided for use with the switching station and managing subscriber information.

In the tenth aspect of the present invention, there is provided a subscriber service information acquisition method comprising the steps of: receiving, at a switching station, a call origination signal from a mobile station; and acquiring, at the switching station, when the call origination signal is received, subscriber service information about the mobile station that has transmitted the call origination signal from a second management unit managing subscriber information in a case where the subscriber service information about the mobile station that has transmitted the call origination signal is not been registered in a first management unit provided for use with the switching station and managing subscriber information.

In the eleventh aspect of the present invention, there is provided a subscriber service information acquisition method comprising the steps of: receiving, at a switching station, a call termination signal to a mobile station; and acquiring, at the switching station, when the call termination signal is received, subscriber service information about the mobile station designated as a destination of the call termination signal from a second management unit managing subscriber information in a case where the subscriber service information about the mobile station designated as the destination of the call termination signal is not registered in a first management unit provided for use with the switching station and managing subscriber information.

In the twelfth aspect of the present invention, there is provided a subscriber service information registration method comprising the steps of: receiving, at a first switching station, a location registration signal from a mobile station; and registering, at the first switching station, when the location registration signal is received, subscriber service information about the mobile station that has transmitted the location registration signal in a management unit provided for use with a second switching station and managing subscriber information in a case where no subscriber service information can be newly registered in a management unit provided for use with the first switching station and managing subscriber information.

In the thirteenth aspect of the present invention, there is provided a subscriber service information acquisition method comprising the steps of: receiving, at a first switching station, a call origination signal from a mobile station; and acquiring, at the first switching station, when the call origination signal is received, subscriber service information about the mobile station that has transmitted the call origination signal from a management unit provided for use with a second switching station and managing subscriber information in a case where the subscriber service information about the mobile station that has transmitted the call origination signal is not registered in a management unit provided for use with the first switching station and managing subscriber information.

In the fourteenth aspect of the present invention, there is provided a subscriber service information acquisition method comprising the steps of: receiving, at a first switching station, a call termination signal to a mobile station; and acquiring, at the first switching station, when the call termination signal is received, subscriber service information about the mobile station designated as a destination of the call termination signal from a management unit provided for use with a second switching station and managing subscriber information in a case where the subscriber service information about the mobile station designated as the destination of the call termination signal is not registered in a management unit provided for use with the first switching station and managing subscriber information.

In the fifteenth aspect of the present invention, there is provided a subscriber service information transmission method comprising the steps of: registering, at a first switching station, at a request from a second switching station, subscriber service information in a management unit provided for use with the first switching station and managing subscriber information; and transmitting, at the first switching station, the service information registered in the management unit to the second switching station at a request from the second switching station.

In the sixteenth aspect of the present invention, there is provided a subscriber service information registration method comprising the steps of: receiving, at a switching station, a location registration signal from a mobile station; and deleting, at the switching station, when the location registration signal is received, one of pieces of subscriber service information presently registered in a first management unit provided for use with the switching station and managing subscriber information, and registering, at the switching station, subscriber service information of the mobile station that has transmitted the location registration signal in the first management unit provided for use with the switching station, in a case where no subscriber service information can be newly registered in the first management unit provided for use with the switching station.

According to the above mentioned configurations, a subscriber can acquire service without dependence on the accommodation capacity of a management unit which manages subscriber information.

The above and other objects, effects, features and advantages of the present invention will become more apparent from the following description of embodiments thereof taken in conjunction with the accompanying drawings.

BRIEF DESCRIPTION OF THE DRAWINGS

FIG. 14 is a diagram for explaining an example of selecting a mobile station whose subscriber service information is to be deleted;

FIG. 16 is a diagram for explaining an example of selecting a mobile station whose subscriber service information is to be deleted;

DETAILED DESCRIPTION OF PREFERRED EMBODIMENTS

Embodiments of the present invention will be described in detail with reference to the accompanying drawings.

(First Embodiment)

Figure 1:
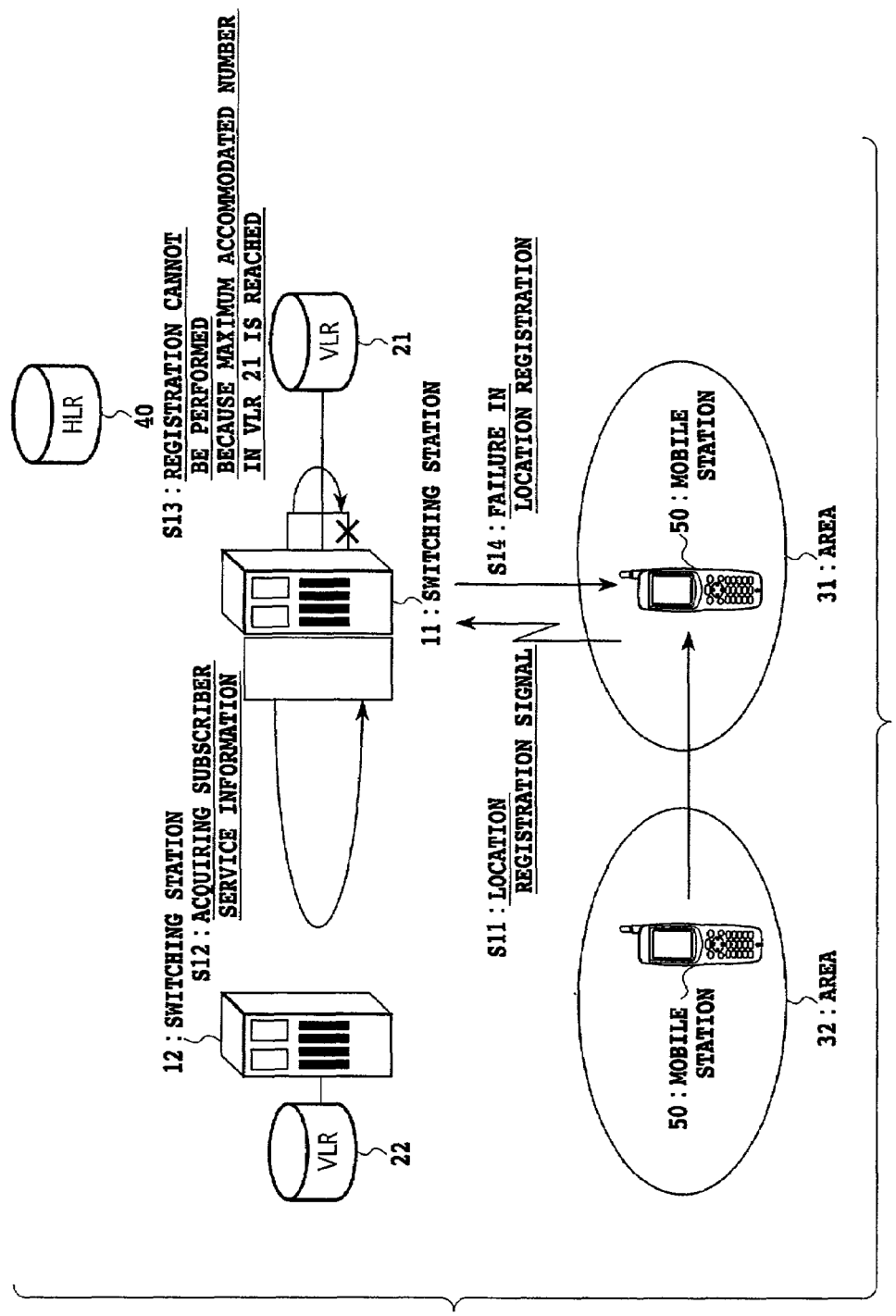
FIG. 1 is a diagram showing an example of a configuration of a conventional mobile communication system and an example of processing when a location registration request is made.
Figure 2:
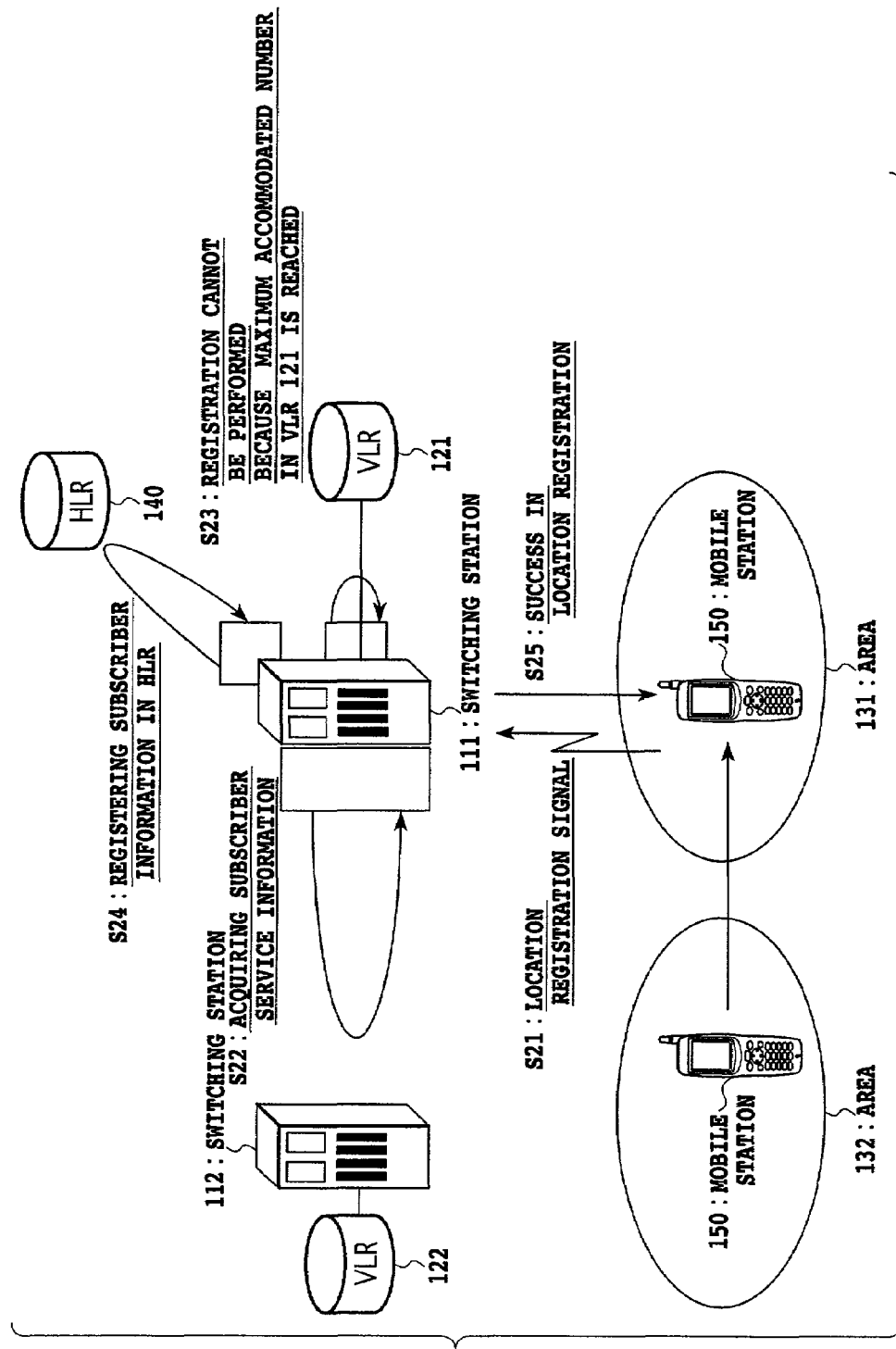
FIG. 2 is a diagram showing an example of a configuration of a mobile communication system and an example of processing when a location registration request is made in the first embodiment of the present invention.

FIG. 2 is a diagram showing an example of a configuration of a mobile communication system and an example of processing when a location registration request is made in the first embodiment of the present invention. Referring to FIG. 2, switching stations 111 and 112 have VLRs 121 and 122, respectively. The VLRs 121 and 122 may be provided inside or outside the switching stations 111 and 112. The VLRs 121 and 122, which are management units respectively used by the switching stations in management of subscriber information, manage subscriber information such as subscriber service information and subscriber location information. An HLR 140 is a management unit which is provided independently of switching stations, and which manages subscriber information.

Figure 3:
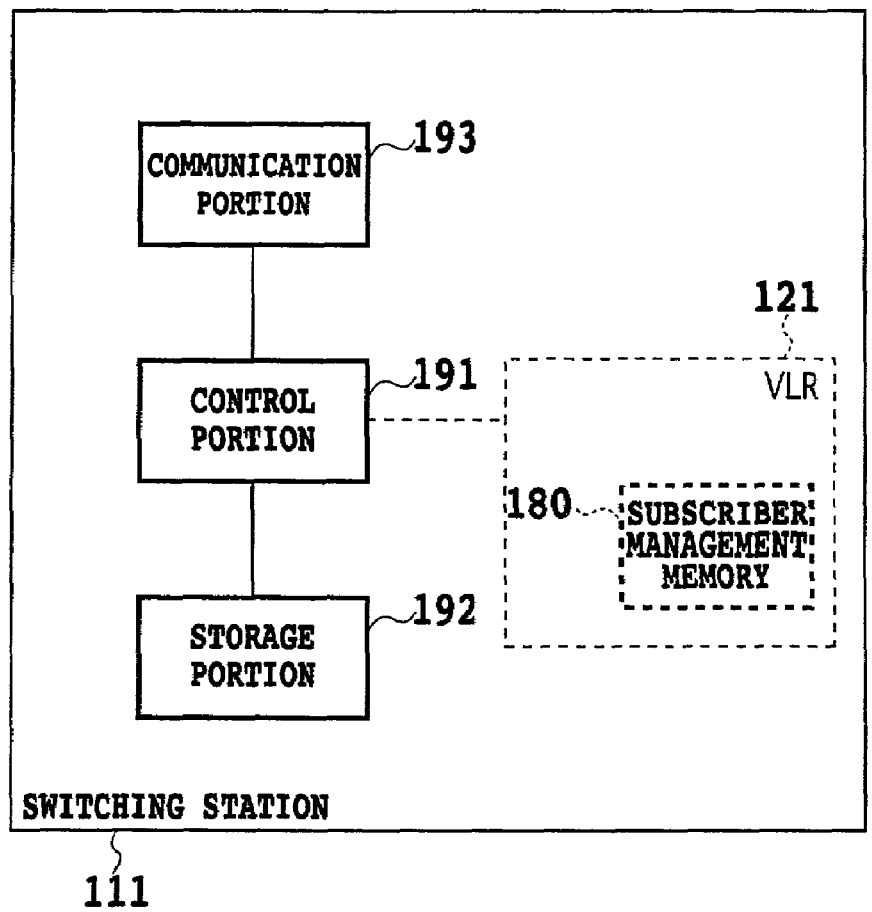
FIG. 3 is a diagram showing an example of a configuration of a switching station.

FIG. 3 is a diagram showing an example of a configuration of a switching station. The switching station 111 has a control portion 191 which performs various kinds of control, a storage portion 192 which stores various processing procedures, data, etc., and a communication portion 193. A VLR 121 may be provided inside or outside the switching station 111, as are those described above. The control portion 191 performs communication with other switching stations, mobile stations, HLRs, VLRs, etc., through the communication portion 193 and other switching stations, base stations or the like. The VLR 121 has a subscriber management memory 180 which stores subscriber information. Other switching stations (the switching station 112 etc.) can have the same configuration as the switching station 111.

Referring again to FIG. 2, when a mobile station 150 moves from an area 132 of the switching station 112 into an area 131 of the switching station 111 having the VLR 121 which has accepted the maximum number of subscribers, the switching station 111 receives a location registration signal from the mobile station 150 (in S21 of FIG. 2) and acquires (in S22) subscriber service information about the mobile station 150 from the switching station 112 in whose coverage area the mobile station 150 has been located. Here, no subscriber service information can be newly registered in the VLR 121 (in S23). However, the switching station 111 registers subscriber location information about the mobile station 150 in the HLR 140 (in S24), as it stores corresponding information in the VLR 121 in the case where subscriber service information can be registered in the VLR 121. The switching station 111 normally completes location registration processing (in S25). The switching station 111 can store in the storage portion 192 or the VLR 121, information of the mobile station 150 as a mobile station whose subscriber service information is not registered in the VLR 121. Thereby, the switching station 111 can recognize that subscriber service information of the mobile station 150 is not registered in the VLR 121, when call origination from the mobile station 150 or call termination to the mobile station 150 occurs later.

Figure 4:
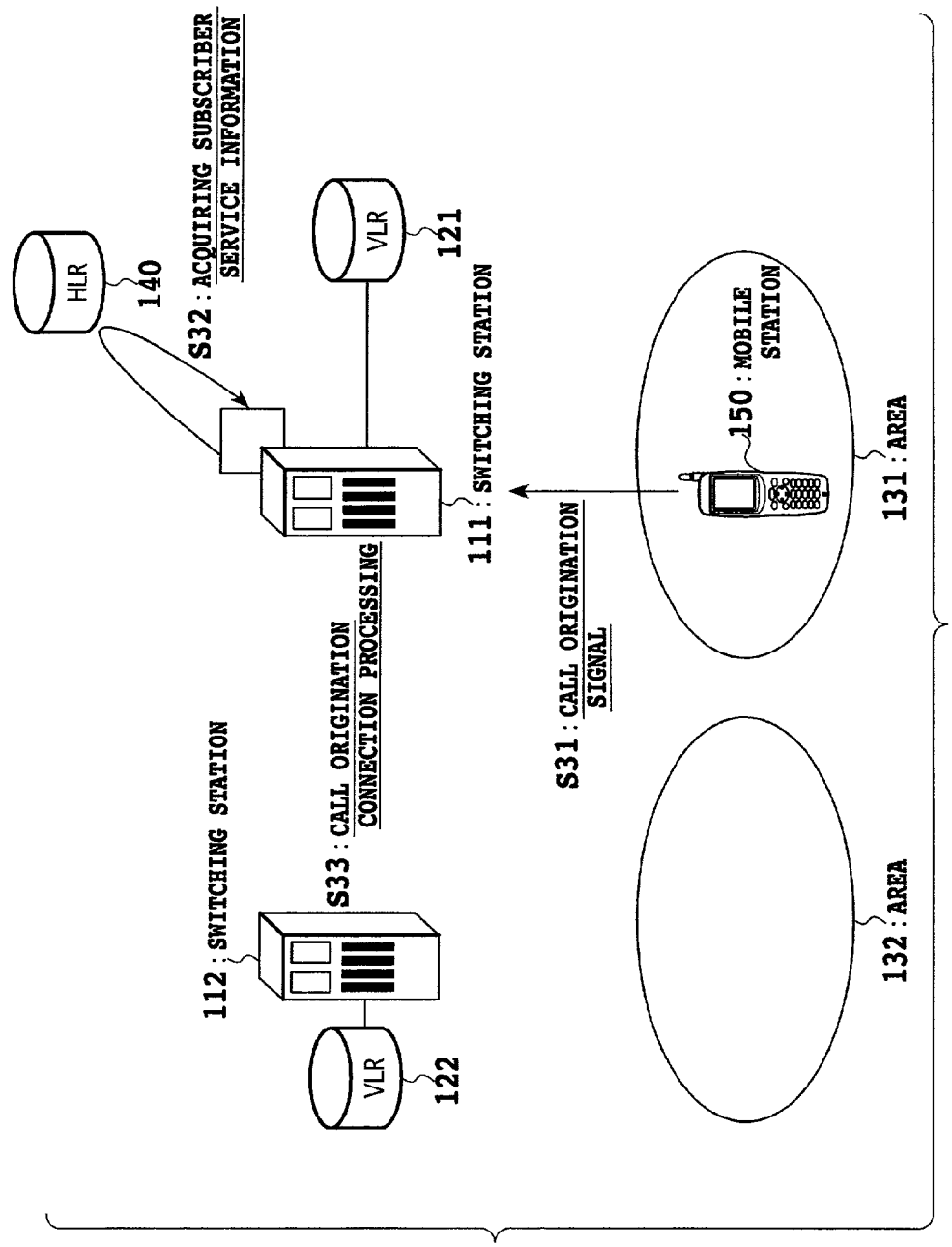
FIG. 4 is a diagram showing an example of processing when a call origination request is made in the first embodiment of the present invention.

FIG. 4 is a diagram showing an example of processing when a call origination request is made in the present embodiment. Thereafter, when a call origination signal is transmitted from the mobile station 150 to the switching station 111 (in S31 of FIG. 4), the switching station 111 acquires subscriber service information about the mobile station 150 from the HLR 140 (in step S32) since the VLR 121 has no subscriber service information about the mobile station 150. Then the switching station 111 normally performs call origination connection processing (in S33).

Figure 5:
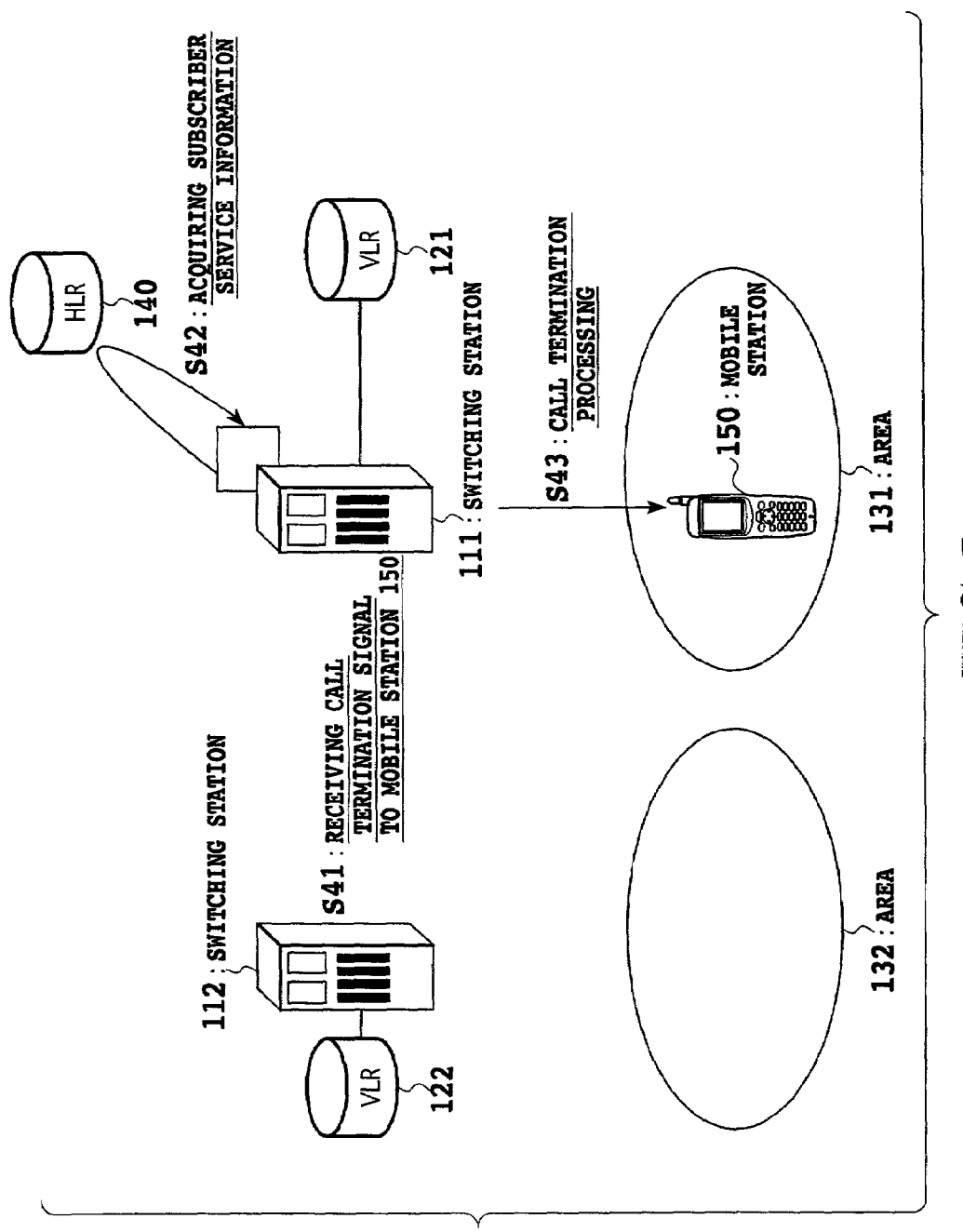
FIG. 5 is a diagram showing an example of processing when a call termination request is made in the first embodiment of the present invention.

FIG. 5 is a diagram showing an example of processing when a call termination request is made in the present embodiment. When a call termination request is made to the mobile station 150, call termination processing can also be performed normally since the subscriber location information about the mobile station 150 has been correctly updated in the HLR 140. When a call termination signal to the mobile station 150 is transmitted to the switching station 111 (in S41 of FIG. 5), the switching station 111 acquires the subscriber service information about the mobile station 150 from the HLR 140 (in S42) and performs call termination processing (in S43).

(Second Embodiment)

The arrangement may alternatively be such that in a case where a switching station cannot register subscriber service information in its own VLR, it registers the subscriber service information in the VLR of another switching station instead of acquiring the subscriber service information from the HLR 140. "Another switching station" may be an adjacent switching station, a switching station in whose coverage area the mobile station has been located, a switching station having a large capacity VLR, etc. A first candidate, a second candidate, and so on for "another switching station" may be determined in advance with respect to each switching station. When one switching station requests another switching station to register subscriber service information, the requested switching station registers the subscriber service information. Each switching station stores information that in which VLR the subscriber service information of the mobile station was stored, if it had subscriber service information registered by the another switching station in a situation where it could not register the subscriber service information of the mobile station in its own VLR. Thereby, the switching station can recognize the VLR in which the subscriber service information is stored, when call origination from the mobile station or call termination to the mobile station occurs later.

Figure 6:
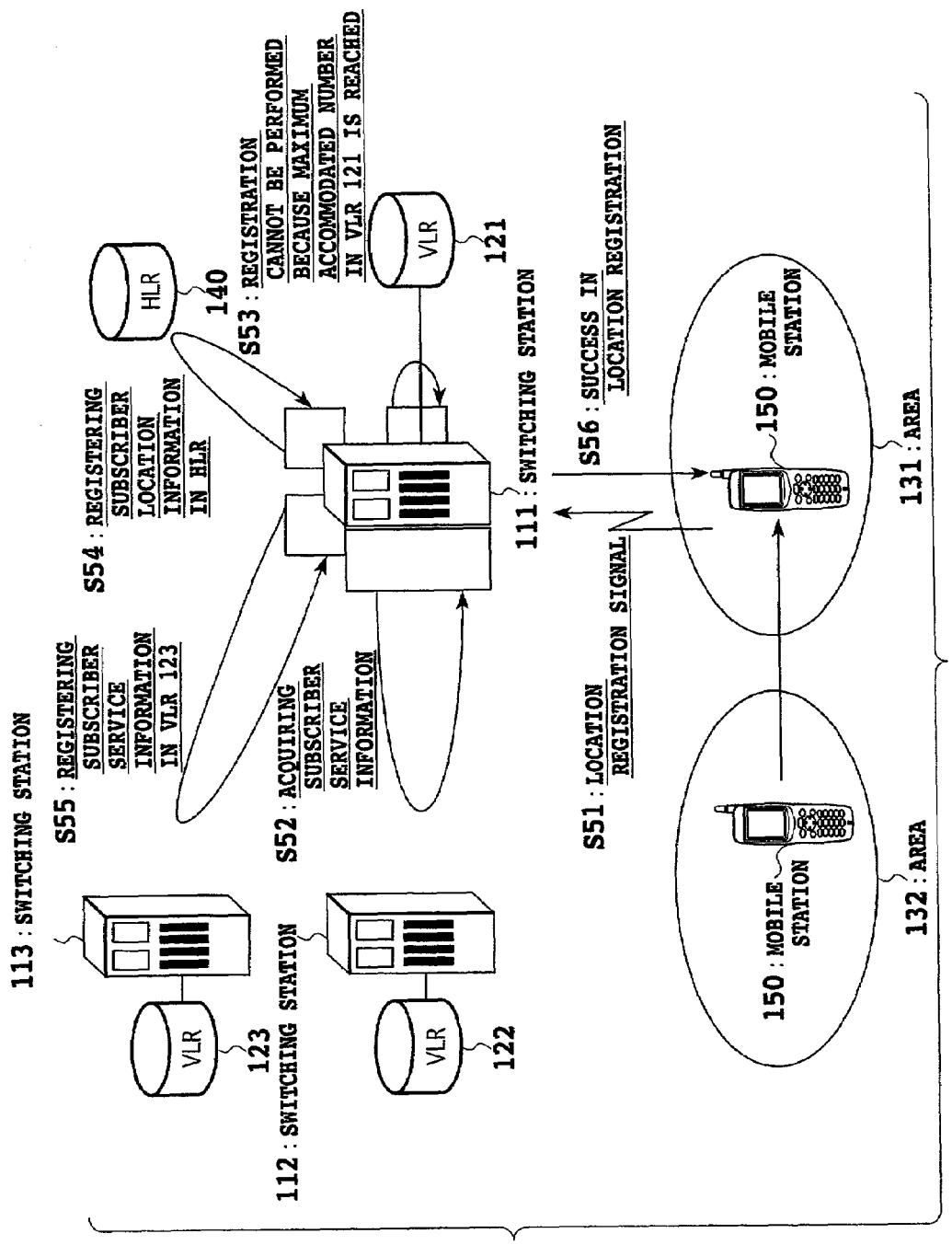
FIG. 6 is a diagram showing an example of processing when a location registration request is made in the second embodiment of the present invention.

FIG. 6 is a diagram showing an example of processing when a location registration request is made in the second embodiment of the present invention. When the mobile station 150 moves from the area 132 of the switching station 112 into the area 131 of the switching station 111 having the VLR 121 which has accepted the maximum number of 10 subscribers, the switching station 111 receives a location registration signal from the mobile station 150 (in S51 of FIG. 6) and acquires (in S52) subscriber service information about the mobile station 150 from the switching station 112 in whose coverage area the mobile station 150 is has been located. Here, no subscriber service information can be newly registered in the VLR 121 (in S53). However, the switching station 111 registers subscriber location information about the mobile station 150 in the HLR 140 (in S54), as it stores corresponding information in the VLR 121 in the case where subscriber service information can be registered in the VLR 121. Further, the switching station 111 registers subscriber service information about the mobile station 150 in another switching station (in a VLR 123 of a switching station 113 in this example) (in S55), and normally completes location registration processing (in S56).

Figure 7:
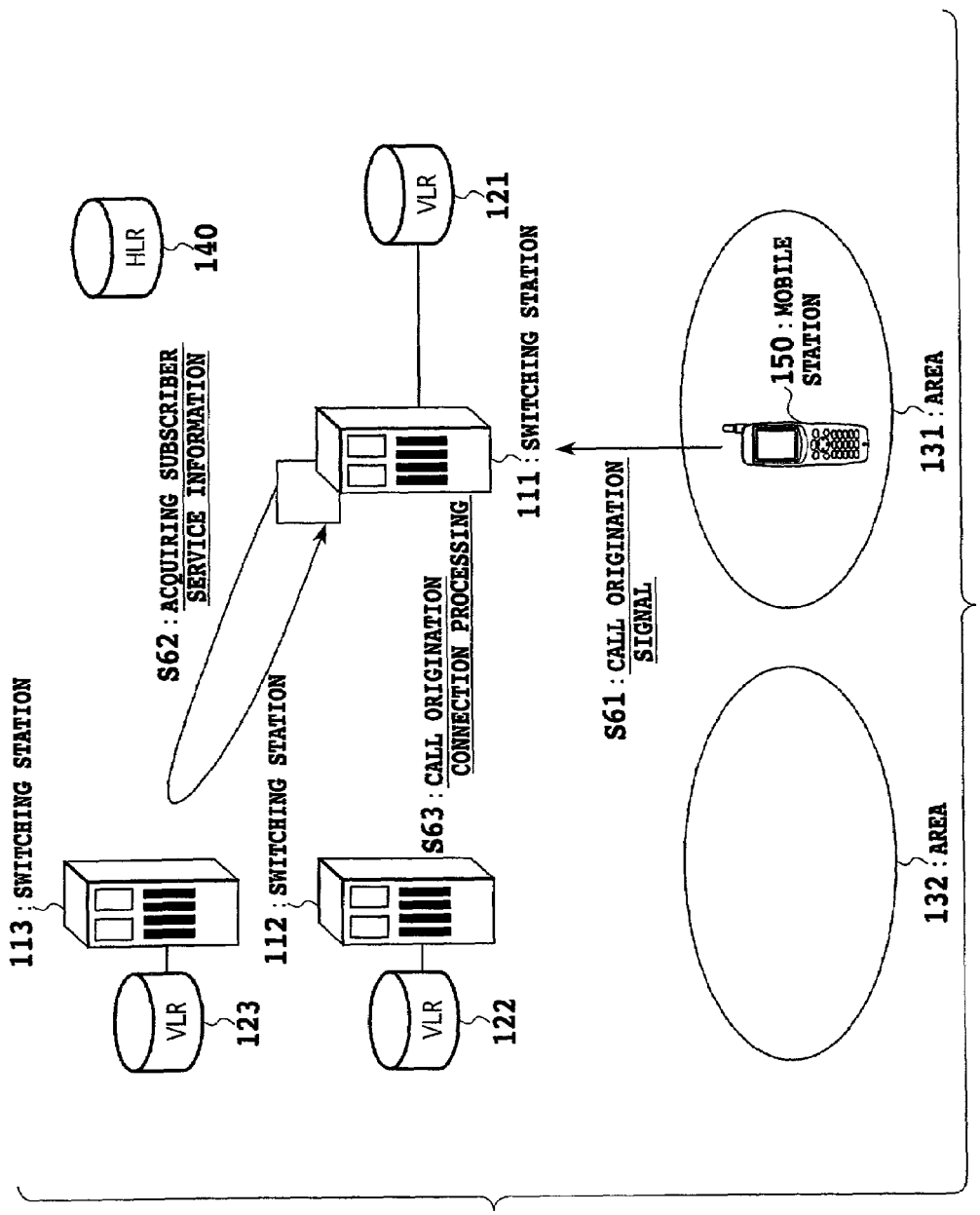
FIG. 7 is a diagram showing an example of processing when a call origination request is made in the second embodiment of the present invention.

FIG. 7 is a diagram showing an example of processing when a call origination request is made in the present embodiment.

When a call origination signal is transmitted from the mobile station to the switching station (in S61 of FIG. 7) after registration in the another VLR, the switching station acquires subscriber service information about the mobile station from the another VLR (in step S62) and performs call origination connection processing (in S63). When the switching station requests the another switching station to transmit the subscriber service information, the another switching station transmits the subscriber service information to the switching station.

Figure 8:
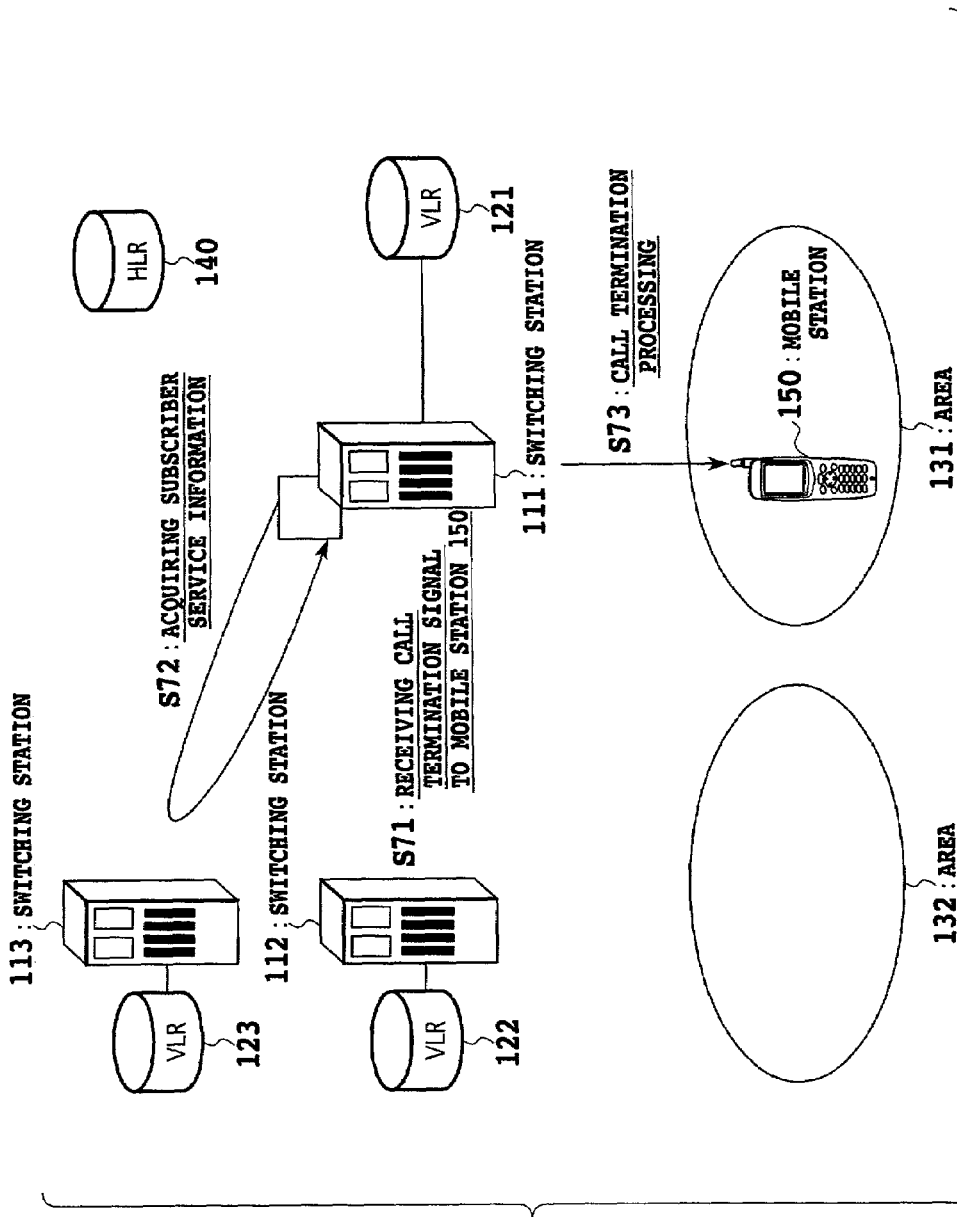
FIG. 8 is a diagram showing an example of processing when a call termination request is made in the second embodiment of the present invention.

FIG. 8 is a diagram showing an example of processing when a call termination request is made in the present embodiment.

When a call termination signal is transmitted to the mobile station (in S71 of FIG. 8) after registration in the another switching station, the switching station acquires the subscriber service information about the mobile station from the another switching station (in S72) and performs call termination processing (in S73). When the switching station requests the another switching station to transmit the subscriber service information, the another switching station transmits the subscriber service information to the switching station.

(Third Emobodiment)

As an alternative to the method of using the method of acquiring subscriber service information from the HLR 140 or the method of registering subscriber service information in another switching station, a method may be used in which a switching station deletes one of pieces of subscriber service information presently registered in its own VLR to enable registration of subscriber service information about a mobile station that has transmitted a location registration signal in its own VLR.

Figure 9:
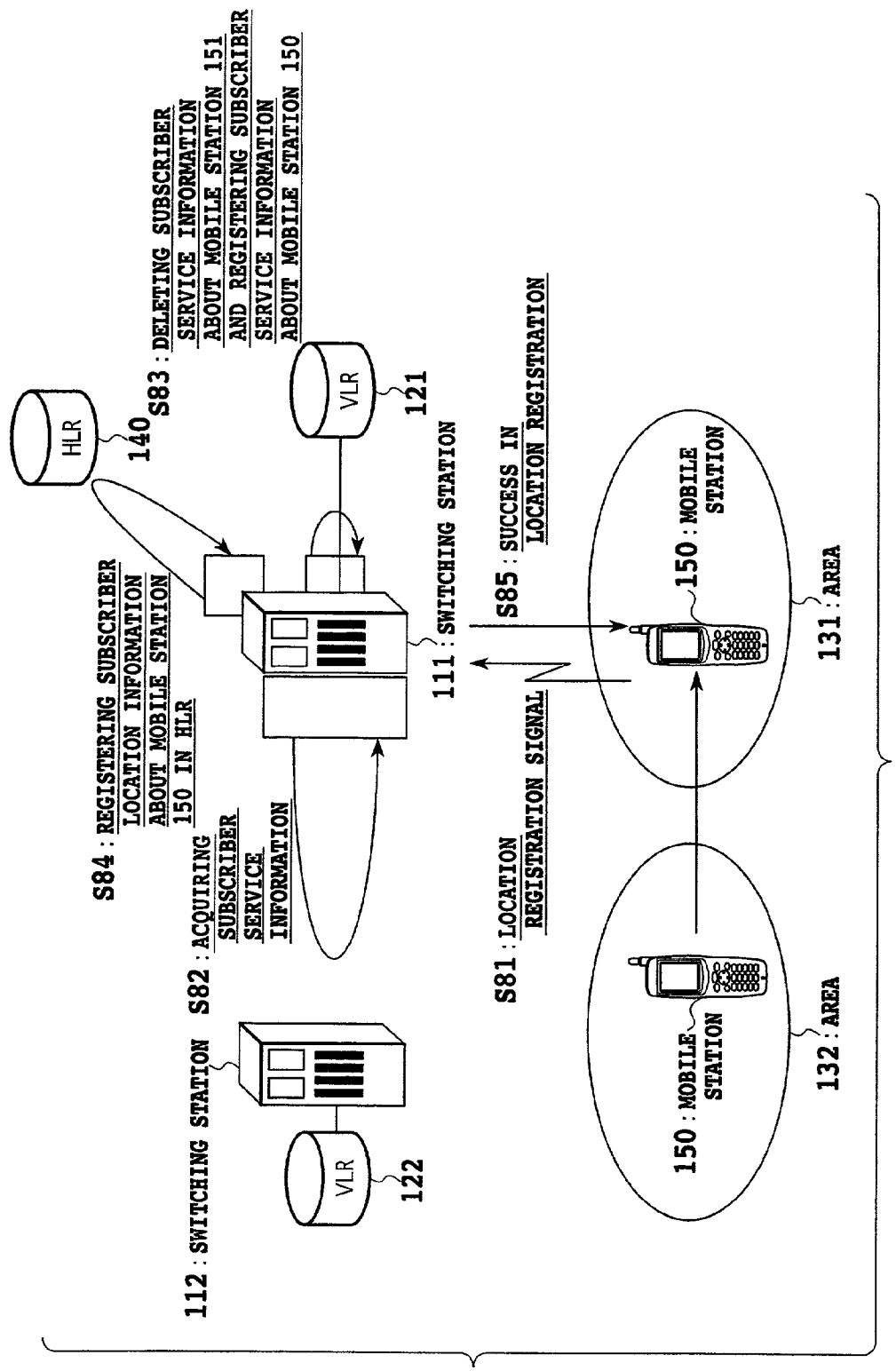
FIG. 9 is a diagram showing an example of processing when a location registration request is made in the third embodiment of the present invention.

FIG. 9 is a diagram showing an example of processing when a location registration request is made in the third embodiment of the present invention. When the mobile station 150 moves from the area 132 of the switching station 112 into the area 131 of the switching station 111 having the VLR 121 which has accepted the maximum number of subscribers, the switching station 111 receives a location registration signal from the mobile station 150 (in S81 of FIG. 9) and acquires (in S82) subscriber service information about the mobile station 150 from the switching station 112 in whose coverage area the mobile station 150 has been located. In this situation, no subscriber service information can be newly registered in the VLR 121. However, the switching station 111 deletes one of pieces of subscriber service information presently registered in the VLR 121 (assumed to be subscriber service information about a mobile station 151) and registers the subscriber service information about the mobile station 150 in the VLR 121 (in S83). The switching station 111 then registers subscriber location information about the mobile station 150 in the HLR 140 (in S84), and normally completes location registration processing (in S85).

The arrangement may be such that when one piece of subscriber service information presently registered in the VLR of the switching station is deleted, deletion from the VLR of the subscriber location information about the mobile station corresponding to the subscriber service information to be deleted is inhibited.

Figure 10:
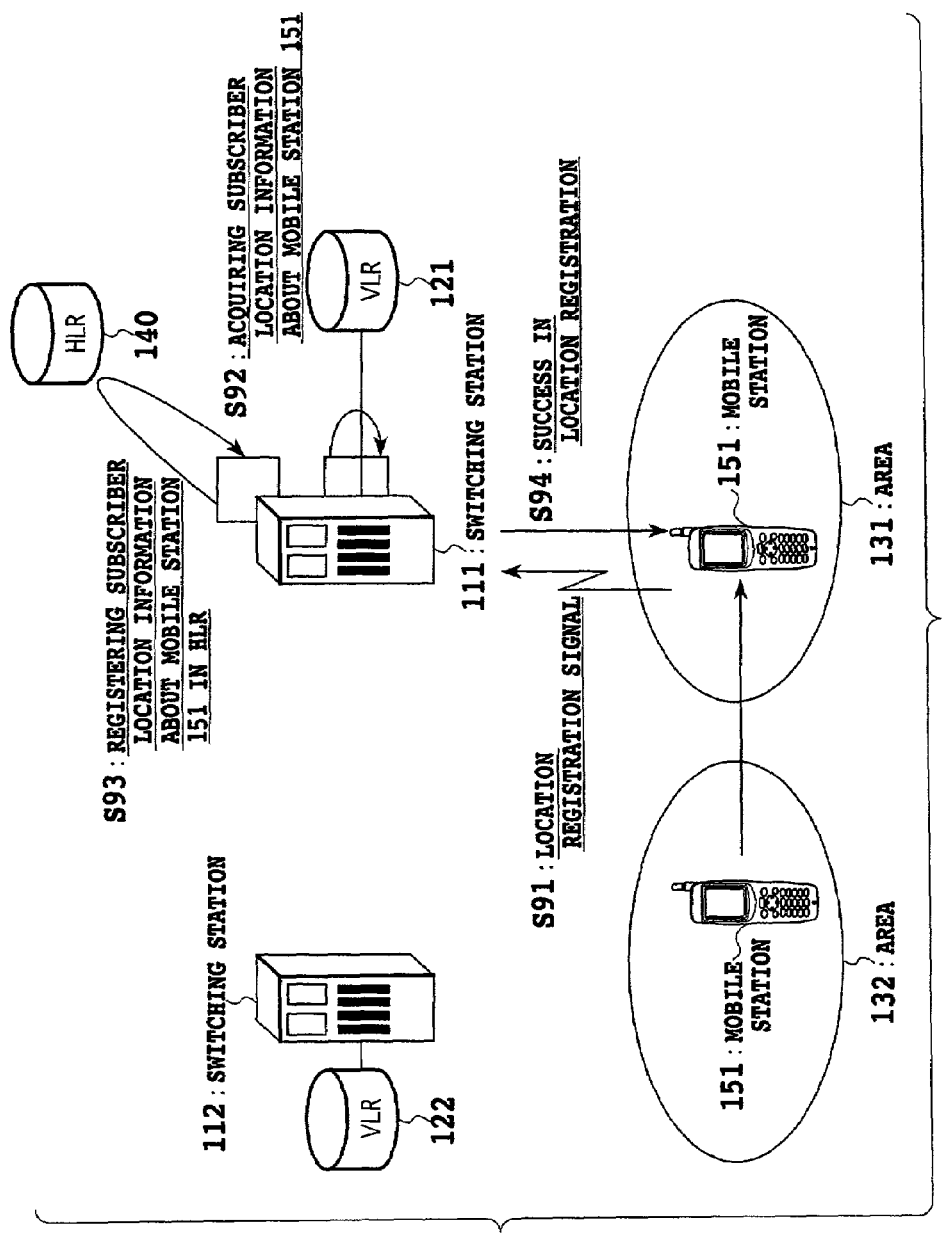
FIG. 10 is a diagram showing an example of processing when a location registration request is made in the third embodiment of the present invention.

FIG. 10 is a diagram showing an example of processing when a location registration request is made in the present embodiment.

Thereafter, when a location registration signal is received from the mobile station whose subscriber service information has been deleted (in S91 of FIG. 10), the switching station can acquire the subscriber location information about the mobile station from its own VLR (in S92), and register it in the HLR 140 (in S93). Then, the switching station normally completes location registration processing (in S94).

Figure 11:
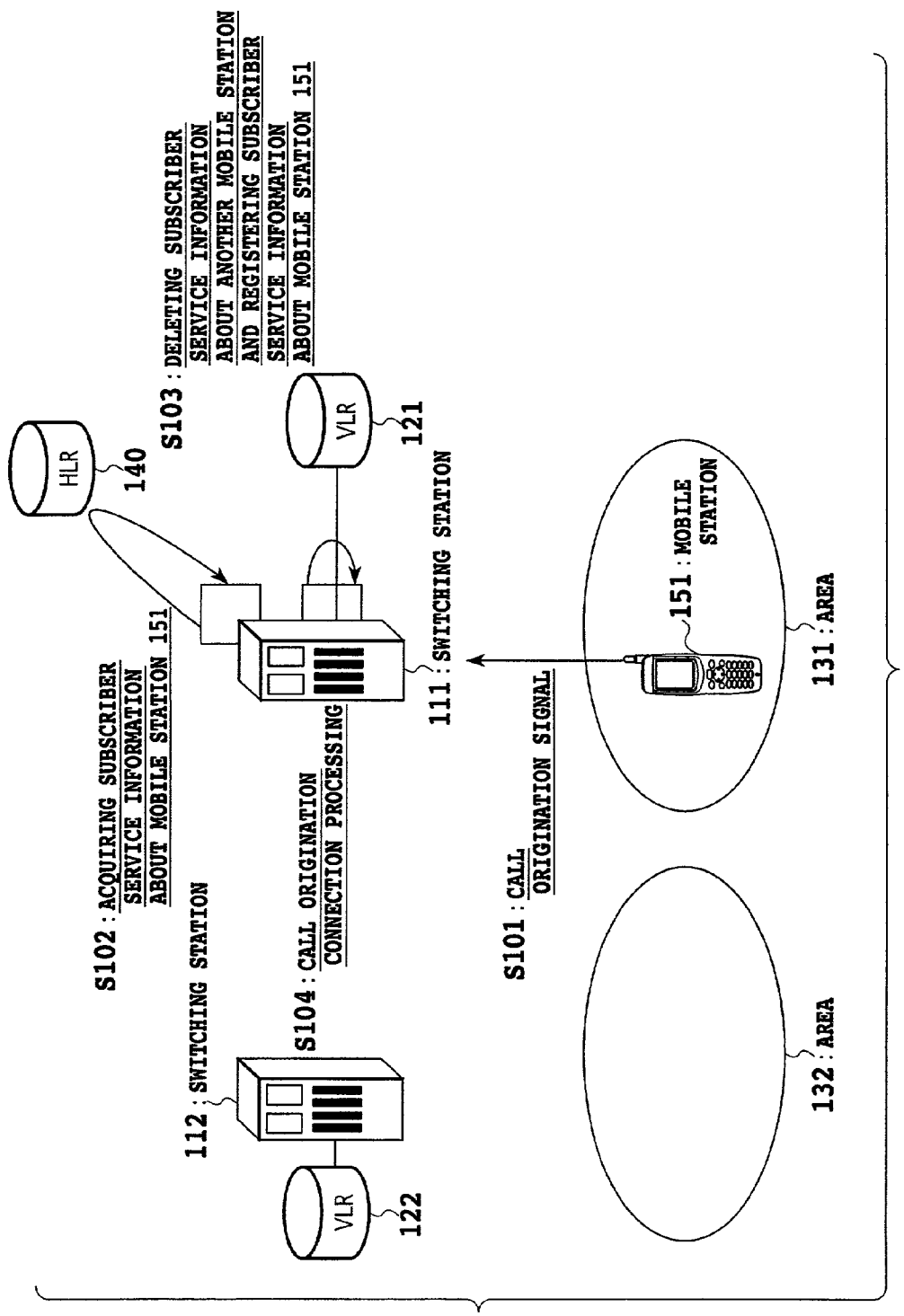
FIG. 11 is a diagram showing an example of processing when a call origination request is made in the third embodiment of the present invention.

FIG. 11 is a diagram showing an example of processing when a call origination request is made in the present embodiment.

In a case where the switching station receives a call origination signal from the mobile station whose subscriber service information has been deleted (in S101 of FIG. 11), the switching station acquires the subscriber service information about the mobile station from the HLR 140 (in S102). If the switching station cannot newly register the acquired subscriber service information in its own VLR, it may delete one of pieces of subscriber service information presently registered in its own VLR and register the acquired subscriber service information in its own VLR (in S103). Then the switching station performs call origination connection processing (in S104).

Figure 12:
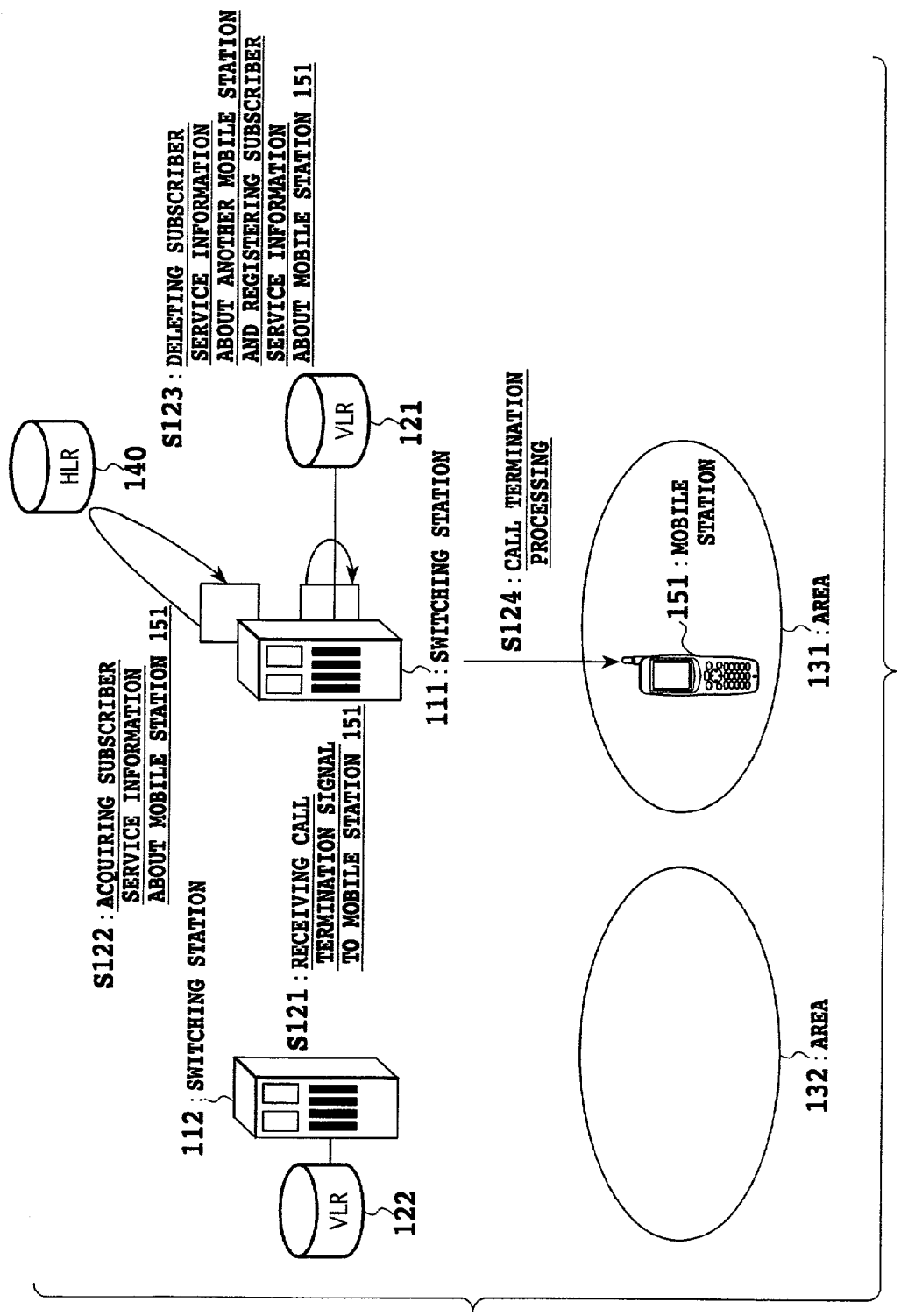
FIG. 12 is a diagram showing an example of processing when a call termination request is made in the third embodiment of the present invention.

FIG. 12 is a diagram showing an example of processing when a call termination request is made in the present embodiment.

In a case where the switching station receives a call termination signal to the mobile station whose subscriber service information has been deleted (in S121 of FIG. 12), the switching station acquires the subscriber service information about the mobile station from the HLR 140 (in S122). If the switching station cannot newly register the acquired subscriber service information in its own VLR, it may delete one of pieces of subscriber service information presently registered in its own VLR and register the acquired subscriber service information in its own VLR (in S123). Then the switching station performs call termination processing (in S124).

In the steps S83 S103 and S123, the mobile station whose subscriber service information is to be deleted can be selected in consideration of call origination, call termination, location registration, power state, etc. of mobile stations.

For example, as the mobile station whose subscriber service information is to be deleted, a mobile station which has made neither call origination nor call termination during the longest time period till the present time can be selected.

Also, for example, as the mobile station whose subscriber service information is to be deleted, a mobile station in detach state, i.e., a mobile station which has made neither call origination, call termination nor location registration for predetermined period of time, or a mobile station whose power state is off can be selected.

The second example will be described in detail.

Figure 13:
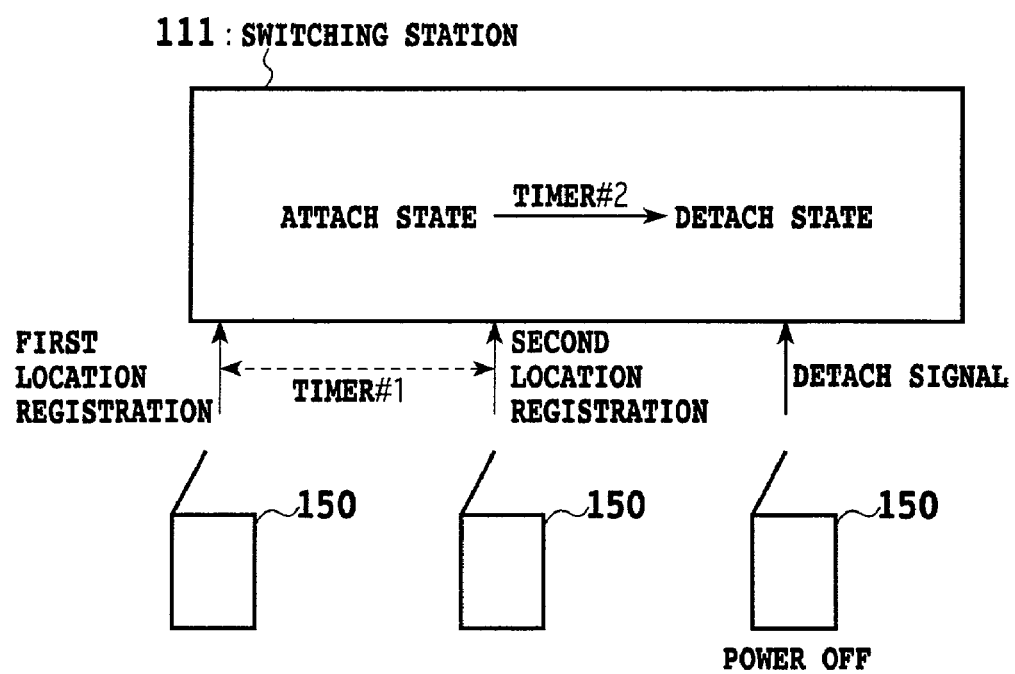
FIG. 13 is a diagram for explaining attach state and detach state.

FIG. 13 is a diagram for explaining attach state and detach state. When location registration is performed for a mobile station, a switching station makes the state of the mobile station attach state. Thereafter, the switching station finds, using a timer #2 (mobile not reachable timer), a mobile station which has made neither call origination, call termination nor location registration for predetermined period of time in the area of the switching station, and makes the state of the found mobile station detach state. The switching station also makes the state of a mobile station detach state, when it receives from the mobile station a detach signal indicating that the power has become off. When a mobile station whose state is detach state makes call origination, call termination or location registration, the switching station makes the state of the mobile station attach state. A mobile station periodically (for example, every three hours) transmits, using a timer #1 (periodic routing update timer), a location registration signal to the switching station to request location registration. Attach state and detach state can be represented, for example, by using off and on of a (detach) flag.

FIG. 14 is a diagram for explaining an example of selecting a mobile station whose subscriber service information is to be deleted. In FIG. 14, the timer #2 column shows, for each mobile station (subscriber), elapsed time since the last time the mobile station made call origination, call termination or location registration. The priority of FIG. 14 is priority (rank) for each mobile station to be selected as the mobile station whose subscriber service information is to be deleted. In the example of FIG. 14, since the state of mobile stations A and B is attach state and the state of mobile stations C and D is detach state, the mobile stations C and D have higher priority than the mobile stations A and B. Between mobile stations having the same state, a mobile station having longer elapsed time has higher priority. Therefore, the mobile station D has higher priority than the mobile station C, and the mobile station B has higher priority than the mobile station A.

The mobile station whose subscriber service information is to be deleted can be selected in consideration of communication state of mobile stations. In general, when subscriber service information is deleted, and if the mobile station corresponding to the deleted subscriber service information is in communication, the communication is disconnected unconditionally. Therefore, as the mobile station whose subscriber service information is to be deleted, a mobile station which is not in communication can be selected. That is, when a switching station intends to select a mobile station as the mobile station whose subscriber service information is to be deleted, and if the mobile station is in communication, the switching station can select another mobile station as the mobile station whose subscriber service information is to be deleted. Communication state of each mobile station can be managed, for example, at VLR or a service control unit performing control regarding call processing and service to subscriber, by having management table of communication state.

Figure 15:
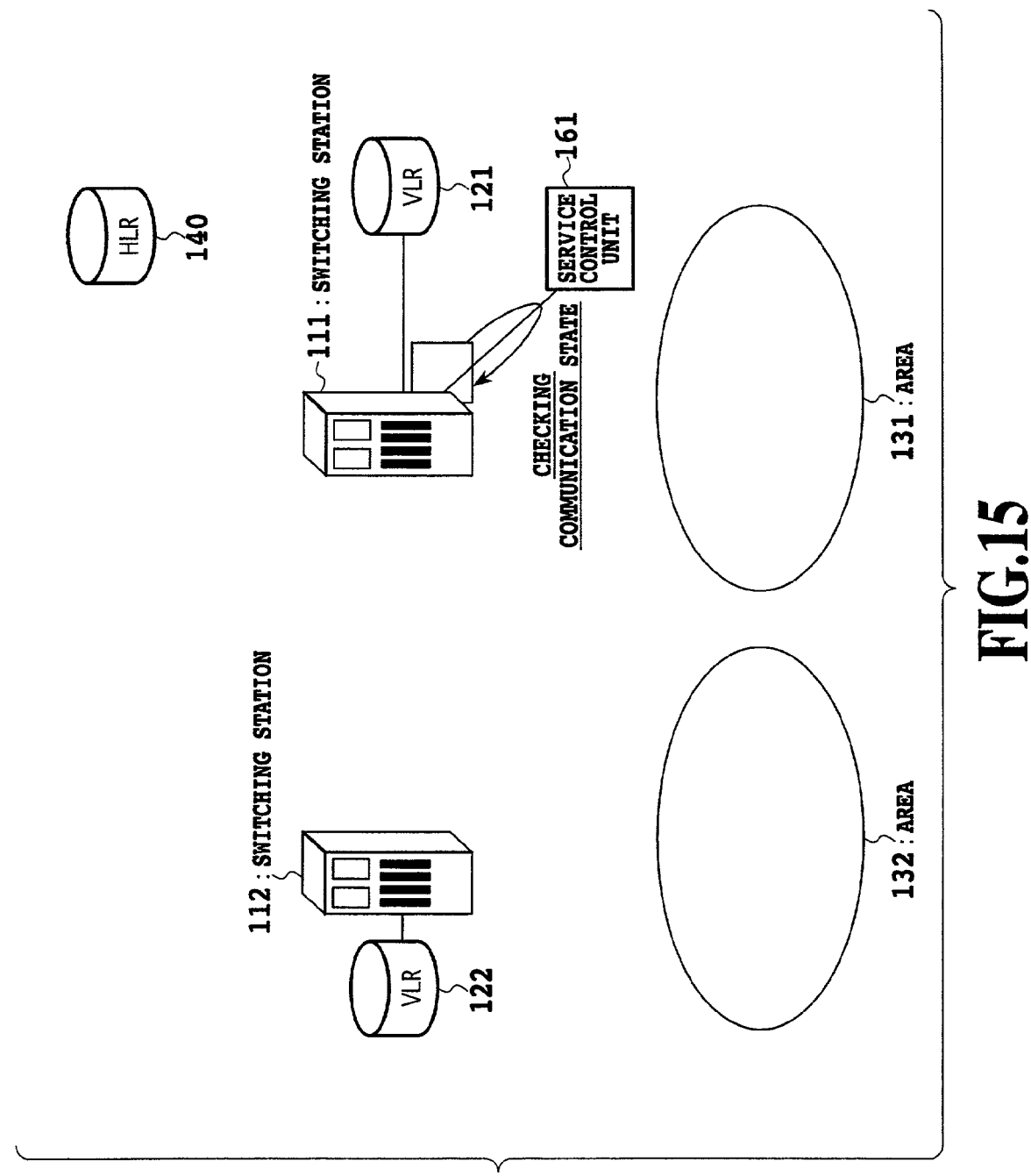
FIG. 15 is a diagram showing an example of inquiring communication state of a service control unit, when the service control unit manages the communication state.

FIG. 15 is a diagram showing an example of inquiring communication state of a service control unit, when the service control unit manages the communication state. In this embodiment, a service control unit is provided for each switching station. The switching station 111 inquires communication state of each mobile station of a service control unit 161, receives its response from the service control unit 161, and selects in consideration of the response, the mobile station whose subscriber service information is to be deleted.

FIG. 16 is a diagram for explaining an example of selecting a mobile station whose subscriber service information is to be deleted. In the example of FIG. 16, since the communication state of mobile stations A and D is not in communication and the state of mobile stations B and C is in communication, the mobile stations A and D have higher priority than the mobile stations B and C. That is, one of the mobile stations A and D is selected as the mobile station whose subscriber service information is to be deleted.

The switching station registers, when it resisters subscriber service information, the subscriber service information as subscriber service information possible to be overwritten (subscriber service information possible to be deleted when the maximum number of accommodated users has been reached in VLR) or as subscriber service information impossible to be overwritten, and selects the subscriber service information to be overwritten from (pieces of) subscriber service information possible to be overwritten. For example, it is possible to register subscriber service information of a subscriber who frequently uses communication as subscriber service information impossible to be overwritten, and register subscriber service information of a subscriber who rarely uses communication as subscriber service information possible to be overwritten.

Figure 17:
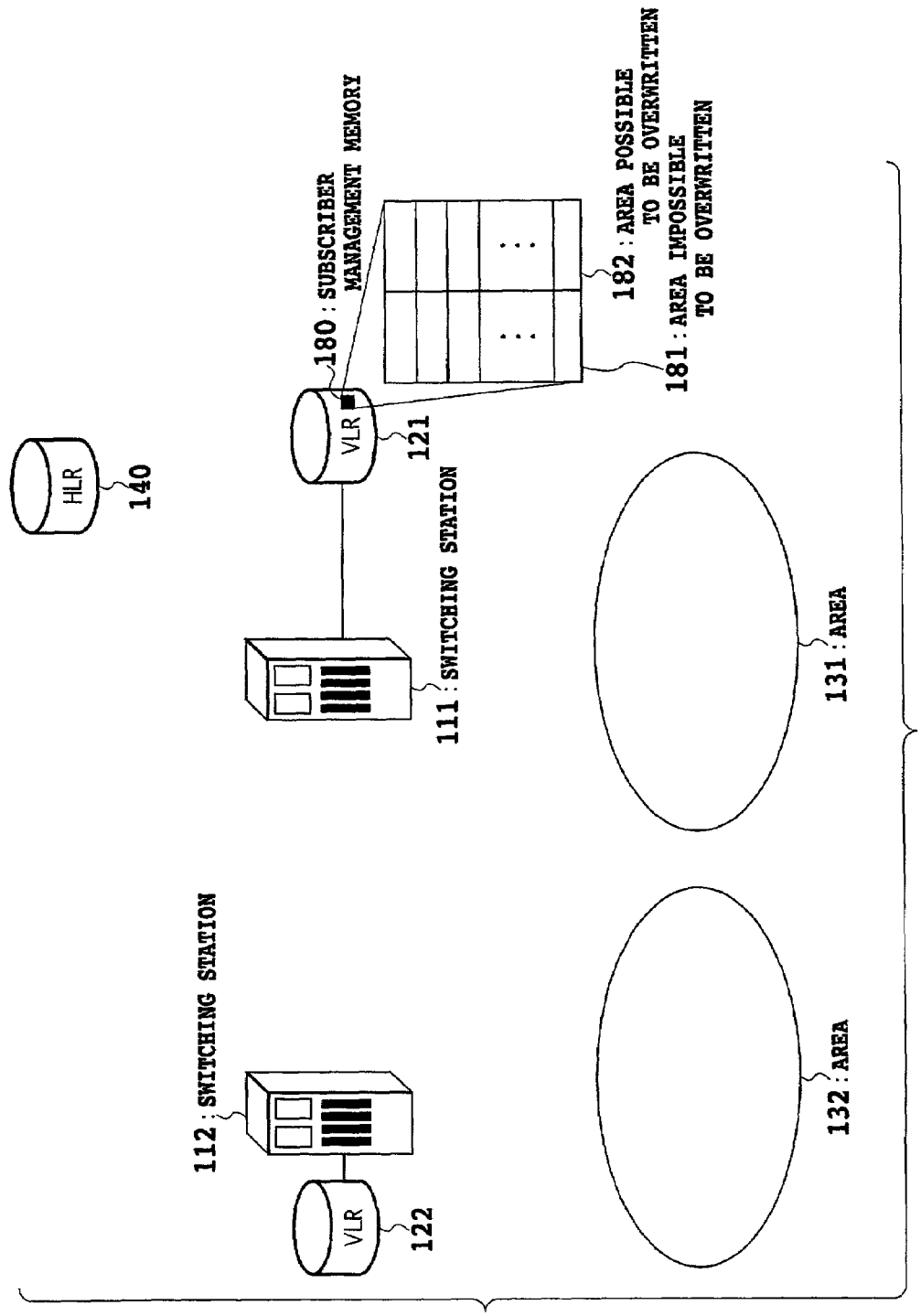
FIG. 17 is a diagram showing an example of preparing an area possible to be overwritten and an area impossible to be overwritten in a subscriber management memory of VLR.

FIG. 17 is a diagram showing an example of preparing an area possible to be overwritten and an area impossible to be overwritten in a subscriber management memory of VLR. The switching station 111 registers subscriber service information possible to be overwritten in an area 181 possible to be overwritten, and registers subscriber service information impossible to be overwritten in an area 182 impossible to be overwritten.

(Others)

In the foregoing description, a case where subscriber service information about a mobile station is acquired from a switching station in whose coverage area the mobile station has been located is described. However, the subscriber service information can be acquired from HLR when location registration other than the first location registration is made as well as when the first location registration is made.

Figure 18:
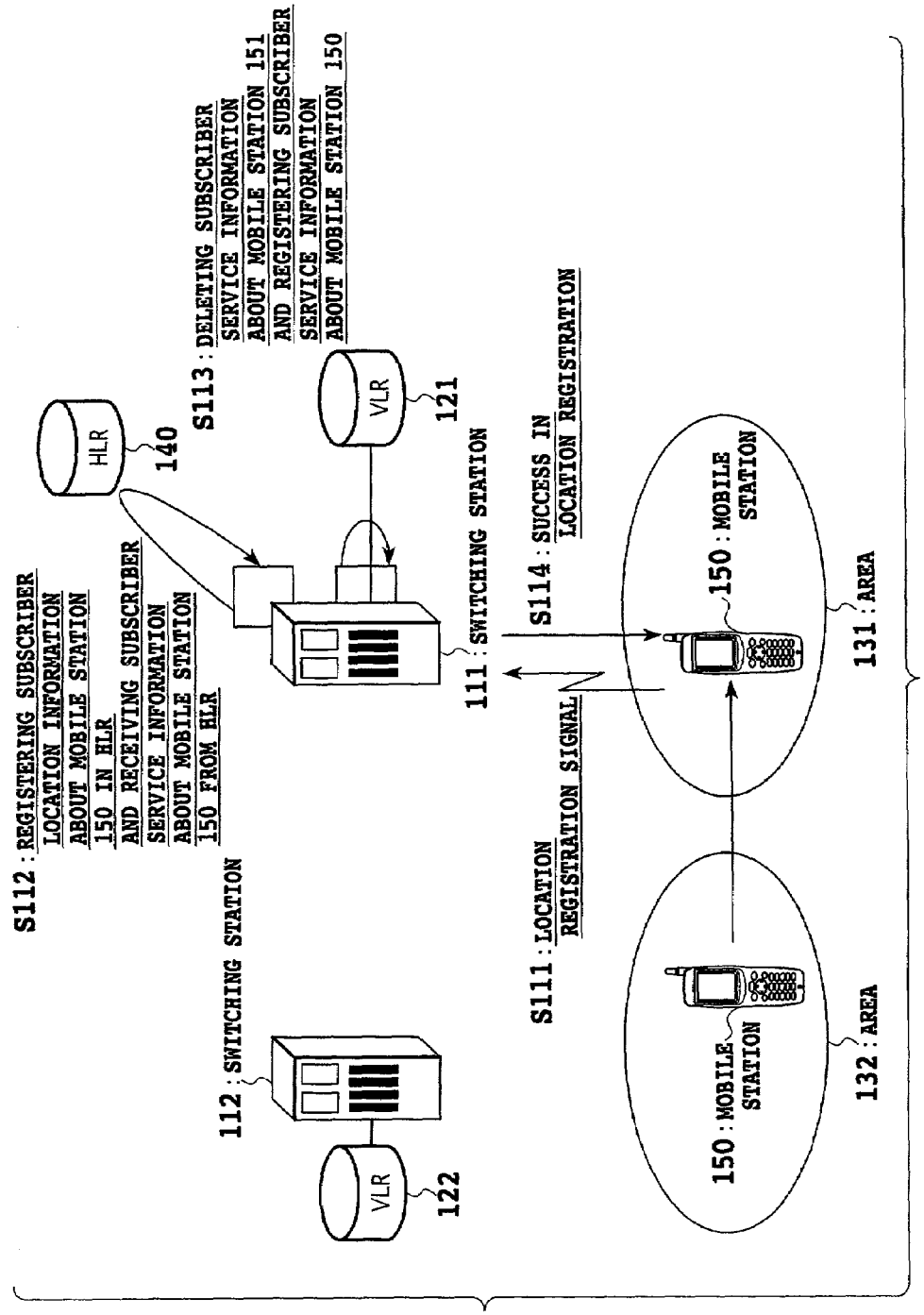
FIG. 18 is a diagram showing an example of processing corresponding to the example of processing shown in FIG. 9 when a location registration request is made, in a case where subscriber service information is acquired from an HLR.

FIG. 18 is a diagram showing an example of processing corresponding to the example of processing shown in FIG. 9 when a location registration request is made, in a case where subscriber service information is acquired from an HLR. When the switching station 111 having the VLR 121 which has accepted the maximum number of subscribers receives a location registration signal from the mobile station 150 (in S111 of FIG. 18), the switching station 111 registers subscriber location information about the mobile station 150 in the HLR 140, and receives subscriber service information about the mobile station 150 from the HLR 140 (in S112). Then, the switching station 111 deletes one of pieces of subscriber service information presently registered in the VLR 121 and registers the subscriber service information about the mobile station 150 in the VLR 121 (in S113). In this way, location registration processing is normally completed (in S114).

According to the present invention, as described above, a subscriber can acquire service without dependence on the accommodation capacity of a management unit which manages subscriber information. That is, the system allows location registration, call origination and call termination processing for subscribers as an excess over the maximum number of accommodated subscribers, and more comfortable communication environment can be provided to subscribers by effectively using VLR memories.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A switching station comprising:
   means for receiving a location registration signal from a mobile station; and
   means for deleting, when the location registration signal is recieved, one of pieces of subscriber service information presently registered in a first management unit provided for use with the switching station and managing subscriber information, and for registering subscriber service information of the mobile station that has transmitted the location registration signal in the first management unit provided for use with the switching station, in a case where no subscriber service information can be newly registered in the first management unit provided for use with the switching station,
   wherein the switching station further comprises means for registering subscriber location information about a mobile station in a second management unit managing subscriber information, and
   wherein when the switching station deletes one of the pieces of subscriber service information presently registered in the first management unit for use with the switching station, the switching station does not delete, from the first management unit for use with the switching station, subscriber location information about a mobile station corresponding to the subscriber service information to be deleted, and wherein when the switching station receives the location registration signal from the mobile station, the switching station registers in the second management unit the subscriber location information about the mobile station registered in the first management unit for use with the switching station.

2. The switching station as claimed in claim 1, wherein said second management unit is an HLR.

3. A switching station comprising:
   means for receiving a location registration signal from a mobile station; and
   means for deleting, when the location registration signal is recieved, one of pieces of subscriber service information presently registered in a first management unit provided for use with the switching station and managing subscriber information, and for registering subscriber service information of the moblie station that has trasmitted the location registration signal in the first management unit provide for the use with the switching station, in a case where no subscriber service information can be newly registered in the first management unit provided for use with the switching station,
   wherein the switching station station further comprises means for receiving a call origination signal from a mobile station, and means for acquiring subscriber service information about a mobile station from a second management unit managing subscriber information, and
   wherein when the switching station receives, after deleting one of pieces of subscriber service information presently registered in the first management unit for use with the switching station, a call origination signal from a mobile station corresponding to the deleted subscriber service information, the switching station acquires the subscriber service information about the mobile station from the second management unit, and, if the acquired subscriber service information cannot be newly registered in the first management unit for use with the switching station, the switching station deletes one of pieces of subscriber service information presently registered in the first management unit, and registers the acquired subscriber service information in the first management unit for use with the switching station.

4. The switching station as claimed in claim 3, wherein said second management unit is an HLR.

5. A switching station comprising:
means for receiving a location registration signal from a mobile station; and
means for deleting, when the location registration is recieved, one of pieces of subscriber service information presently registered in a first management unit provided for use with the switching station and managing subscriber information, and for registering subscriber service information of the mobile station that has transmitted the location registration signal in the first management unit provided for use with the switching station, in a case where no subscriber service information can be newly registered in the first management unit provided for use with the switching station,
wherein the switching station further comprises means for receiving a call termination signal to a mobile station, and means for acquiring subscriber service information about a mobile station from a second management unit managing subscriber information, and
wherein when the switching station receives, after deleting one of pieces of subscriber service information presently registered in the first management unit for use with the switching station, a call termination signal to a mobile station corresponding to the deleted subscriber service information, the switching station acquires the subscriber service information about the mobile station from the second management unit, and, if the acquired subscriber service information cannot be newly registered in the first management unit for use with the switching station, the switching station deletes one of pieces of subscriber service information presently registered in the first management unit, and registers the acquired subscriber service information in the first management unit for use with the switching station.

6. The switching station as claimed in claim 5, wherein said second management unit is an HLR.

7. A subscriber service information registration method comprising the steps of:
receiving, at a switching station, a location registration signal from a mobile station; and
deleting, at the switching station, when the location registration signal is received, one of pieces of subscriber service information presently registered in a first management unit provided for use with the switching station and managing subscriber information, and registering, at the switching station, subscriber service information of the mobile station that has transmitted the location registration signal in the first management unit provided for use with the switching station, in a case where no subscriber service information can be newly registered in the first management unit provided for use with the switching station,
wherein the method further comprises a step of registering, at the switching station, subscriber location information about a mobile station in a second management unit managing subscriber information, and
wherein when the method deletes one of pieces of subscriber service information presently registered in the first management unit for use with the switching station, the method does not delete, from the first management unit for use with the switching station, subscriber location information about a mobile station corresponding to the subscriber service information to be deleted, and wherein when the method receives the location registration signal from the mobile station, the method registers in the second management unit the subscriber location information about the mobile station registered in the first management unit for use with the switching station.

8. The method as claimed in claim 7, wherein said second management unit is an HLR.

9. A subscriber service information registration method comprising the steps of:
receiving, at a switching station, a location registration signal from a mobile station; and
deleting, at the switching station, when the location registration signal is received, one of pieces of subscriber service information presently registered in a first management unit provided for use with the switching station and managing subscriber information, and registering, at the switching station, subscriber service information of the mobile station that has transmitted the location registration signal in the first management unit provided for use with the switching station, in a case where no subscriber service information can be newly registered in the first management unit provided for use with the switching station,
wherein the method further comprises a step of receiving, at the switching station, a call origination signal from a mobile station, and a step of acquiring, at the switching station, subscriber service information about a mobile station from a second management unit managing subscriber information, and
wherein when the method receives, after deleting one of pieces of subscriber service information presently registered in the first management unit for use with the switching station, a call origination signal from a mobile station corresponding to the deleted subscriber service information, the method acquires the subscriber service information about the mobile station from the second management unit, and, if the acquired subscriber service information cannot be newly registered in the first management unit for use with the switching station, the method deletes one of pieces of subscriber service information presently registered in the first management unit, and registers the acquired subscriber service information in the first management unit for use with the switching station.

10. The method as claimed in claim 9, wherein said second management unit is an HLR.

11. A subscriber service information registration method comprising the steps of:
receiving, at a switching station, a location registration signal from a mobile station; and
deleting, at the switching station, when the location registration signal is received, one of pieces of subscriber service information presently registered in a first management unit provided for use with the switching station and managing subscriber information, and registering, at the switching station, subscriber service information of the mobile station that has transmitted the location registration signal in the first management unit provided for use with the switching station, in a case where no subscriber service information can be newly registered in the first management unit provided for use with the switching station, wherein the method further comprises a step of receiving, at the switching station, a call termination signal to a mobile station, and a step of acquiring, at the switching station, subscriber service information about a mobile station from a second management unit managing subscriber information, and wherein when the method receives, after deleting one of pieces of subscriber service information presently registered in the first management unit for use with the switching station, a call termination signal to a mobile station corresponding to the deleted subscriber service information, the method acquires the subscriber service information about the mobile station from the second management unit, and, if the acquired subscriber service information cannot be newly registered in the first management unit for use with the switching station, the method deletes one of pieces of subscriber service information presently registered in the first management unit, and registers the acquired subscriber service information in the first management unit for use with the switching station.

12. The method as claimed in claim 11, wherein said second management unit is an HLR.

* * * * *